United States Patent [19]

Danielli

[11] Patent Number: 5,508,944
[45] Date of Patent: Apr. 16, 1996

[54] APPARATUS AND METHOD FOR CHECKING FEATURES OF A CAMSHAFT

[75] Inventor: Franco Danielli, Zola Predosa (BO), Italy

[73] Assignee: Marposs, S.p.A., Bentivoglio-BO, Italy

[21] Appl. No.: 211,492

[22] PCT Filed: Nov. 2, 1992

[86] PCT No.: PCT/EP92/02512

§ 371 Date: Apr. 7, 1994

§ 102(e) Date: Apr. 7, 1994

[87] PCT Pub. No.: WO93/10420

PCT Pub. Date: May 27, 1993

[30] Foreign Application Priority Data

Nov. 12, 1991 [IT] Italy .................. BO91A0417

[51] Int. Cl.$^6$ ..................................... G01B 5/20
[52] U.S. Cl. ................. 364/560; 33/519; 33/546; 33/551; 33/558.2; 364/506
[58] Field of Search ................. 33/519, 546, 551, 33/556, 558.01, 558.2; 364/463, 506, 560

[56] References Cited

U.S. PATENT DOCUMENTS

| | | | |
|---|---|---|---|
| 3,234,655 | 2/1966 | Skeels et al. | 33/519 X |
| 3,269,257 | 8/1966 | Hoglund | 33/519 X |
| 3,532,863 | 10/1970 | Enslein et al. | 33/519 X |
| 3,731,386 | 5/1973 | Kreiensen et al. | 33/519 X |
| 3,805,036 | 4/1974 | Michaud et al. | 364/560 |
| 4,622,756 | 11/1986 | Marsden | 33/556 |
| 5,140,534 | 8/1992 | Miller et al. | 364/560 |

FOREIGN PATENT DOCUMENTS

| | | |
|---|---|---|
| 2552873 | 10/1984 | France . |
| 1938231 | 7/1969 | Germany . |
| 8629052.5 | 10/1986 | Germany . |
| 1273479 | 7/1970 | United Kingdom . |
| 2148007 | 10/1983 | United Kingdom . |
| 1388138 | 10/1986 | United Kingdom . |

*Primary Examiner*—Edward R. Cosimano
*Attorney, Agent, or Firm*—Dickstein, Shapiro & Morin

[57] ABSTRACT

A camshaft checking apparatus, in particular for checking the parameters of the profiles of cams, comprising a support structure and a motor means for positioning and axially rotating the shaft, linear transducers for determining radial dimensions of cams in the course of the rotation, a measuring head for cooperating with a reference portion of the camshaft and locating an angular shaft reference position, a rotary transducer for defining said angular position and angular measuring positions, and a control unit for receiving and processing signals arriving from the linear transducers, measuring head and the rotary transducer. For each cam a sequence of values pertaining to its profile is memorized and processed, the value of the mutual phase difference with respect to a nominal profile is calculated, and the actual profile to be checked is inspected with reference to a second nominal profile determined by angularly displacing the nominal profile by an angle equal to the value of the calculated phase difference.

25 Claims, 4 Drawing Sheets

APPARATUS AND METHOD FOR CHECKING FEATURES OF A CAMSHAFT

TECHNICAL FIELD

The invention relates to an apparatus for checking geometric and dimensional characteristics of a shaft with cams, comprising a support structure with elements for the support and the mechanical reference of the shaft that define a longitudinal geometric axis, drive means, checking means, coupled to the support structure, comprising first checking elements adapted to cooperate with the outer surface of the cams and providing signals responsive to the radial dimensions of the cams, scanning means, and a memorizing, processing and display unit, connected to the checking means and to the scanning means, for processing said signals responsive to the radial dimensions of the cams.

The invention also relates to a method for checking the features of a shaft with cams, in particular parameters regarding the profiles of the cams, by means of an apparatus with checking elements, comprising the steps of generating mutual rotational displacements between the shaft and the checking elements, detecting, in the course of the rotation, by means of first checking elements, measurement values relating to the radial dimensions of the shaft that define actual profiles of said cams, and calculating values of deviation between the measurement values and the values of corresponding nominal profiles, for checking said parameters.

BACKGROUND ART

Among the dimensional inspections that are normally carried out on a camshaft for an internal combustion engine, in addition to the simple dimensional and geometric characteristics of the main journals and the cams, nowadays there are also those for checking other parameters of the cam profile as, for example, the slope and the slope variations of the profile. Inaccurate values of these parameters may, in fact, affect the running of the engine where the shaft is fitted, and cause, in particular, the improper opening and/or closing of the associated valves. In turn this may produce, for example, violent impacts between valves and valve seats, thereby causing noise, wear and damage to the valves and/or the detrimental-emission of combustion components and consequently the dispersion of pollutants into the atmosphere.

In order to be in a position to fully evaluate the above parameters, it is necessary to gain information pertaining to the profile trend of each cam.

A method and a device for measuring the profile of a cam are disclosed in British patent GB-A-1273479, wherein the radial dimensions of a cam placed in rotation are measured at specific angular positions and a suitable device controls the comparison made between measured values and corresponding desired values. The angular position of the cam with respect to a theoretical cam having the desired values is determined at first on the basis of a comparison, not described in detail, between a desired and a measured value.

In order to determine with greater accuracy the angular position of a cam there are also known devices as those described in British patent GB-A-1320929 and U.S. Pat. No. 3,731,386 wherein the angular position of the lobe of a cam is determined by employing one or more transducers to scan the profile of the cam and processing the signals so obtained. This way of operating may lead to inexact evaluations as it bases itself on not very sophisticated processings of data that result from measurement of a profile to be checked and therefore are presumably affected by error.

Thus the aforementioned methods and devices do not guarantee a precise measurement of a cam profile, and do not enable a rapid and strictly accurate inspection of an entire camshaft.

Another known method for checking the profile of a cam of a camshaft is described and illustrated in English patent application GB-A-2148007. While the shaft is axially rotated, signals relating to radial dimensions of the cam and signals relating to the angular position of the cam are sent in a continuous way to a processor unit that matches the values of one and the other type and compares these values with known nominal values of the cam profile. Before the actual measurement cycle starts, an initial angular reference value is determined, by inspecting the profile of the cam to be checked and processing the collected data. Even though this method involves relatively simple mechanical and control means for its embodiment, it requires the storing and the processing of an enormous amount of data. Furthermore, only one cam at a time can be measured and the changeover from one cam to another requires the repeating of operations like the determining of the initial angular reference point of the new profile. This initial reference may even turn out to be inexact as it greatly depends on possible errors in the actual dimensions of the cam.

DISCLOSURE OF INVENTION

An object of the invention is to provide an apparatus for checking the profile of cams on a camshaft and a relevant checking method, that enables the performance of an accurate and rapid check and overcomes the disadvantages of the known methods and apparatuses.

This and other objects and advantages are reached by an apparatus according to the present invention, in which the checking means comprise second checking elements, distinct from the first checking elements, cooperating with an angular reference portion of the shaft, the memorizing, processing and display unit being adapted to define, on the basis of the signals provided by the second checking elements, a determined angular reference position for the shaft, memorize, in correspondence to said determined angular reference position of the shaft and to each of prefixed angular spacings starting from said reference position, values detected from the signals provided by all the first checking elements, said prefixed angular spacings being scanned, in the course of the rotation, by the scanning means, process said detected values to provide sequences of relevant measurement values of radial dimensions of the cams, compare the measurement values for each cam with corresponding values relating to a known nominal profile and processing the results of these comparisons for obtaining a value of an angular arrangement error between the sequence of measurement values and the nominal profile, and process, for each of the cams, the measurement values, the values relating to the nominal profile and the angular arrangement error for checking parameters regarding the profiles of the cams.

The same objects and advantages are also reached by a method according to the present invention, comprising the further steps of determining, in the course of the rotational displacements, an angular reference position for the shaft by means of second checking elements, distinct from the first, the measurement values being detected in correspondence to said angular reference position and at prefixed angular spacings starting from it, and processing the measurement values with the values of the nominal profiles in order to determine, before said calculating step, the value of an angular arrangement error between the actual profile and the corresponding nominal profile of each cam.

The main result attained by an apparatus and a method according to the invention is the possibility of performing a particularly accurate and rapid checking of the profile of cams on a camshaft, determining, in an automatic and accurate way, the angular position of the cams on the camshaft and automatically evaluating and compensating any variations in the angular position, in order to provide a correct comparison between each checked and the corresponding nominal profile.

BRIEF DESCRIPTION OF THE DRAWINGS

The invention is now described in detail with reference to the enclosed sheets of drawings, given by way of non-limiting example, wherein.

BEST MODE FOR CARRYING OUT THE INVENTION

Figure 1:
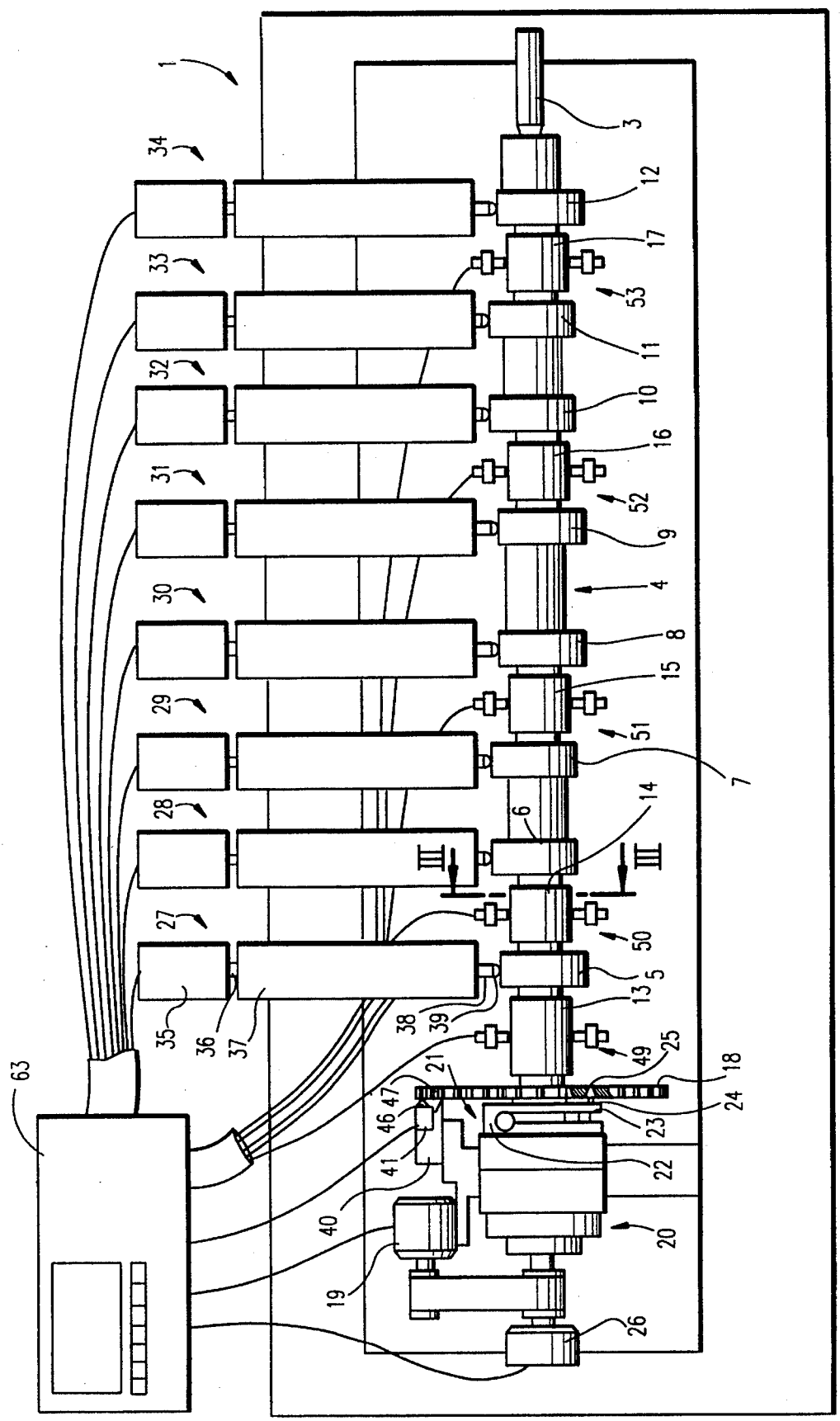
FIG. 1 is a schematic front view of an apparatus according to a preferred embodiment of the invention, with some details cross-sectioned.
Figure 2:
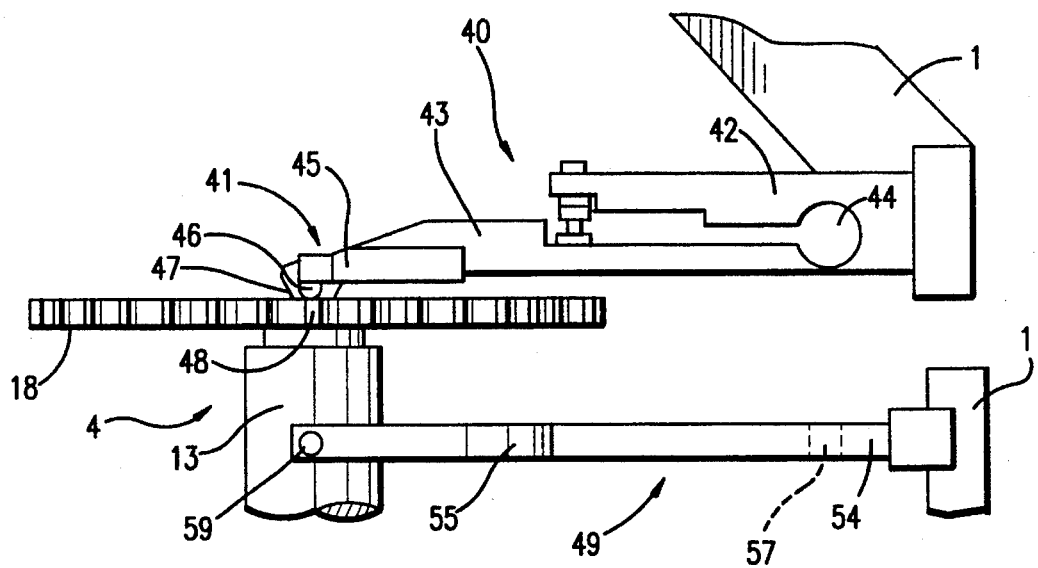
FIG. 2 is an enlarged scale detail showing some elements of the apparatus of FIG. 1.
Figure 3:
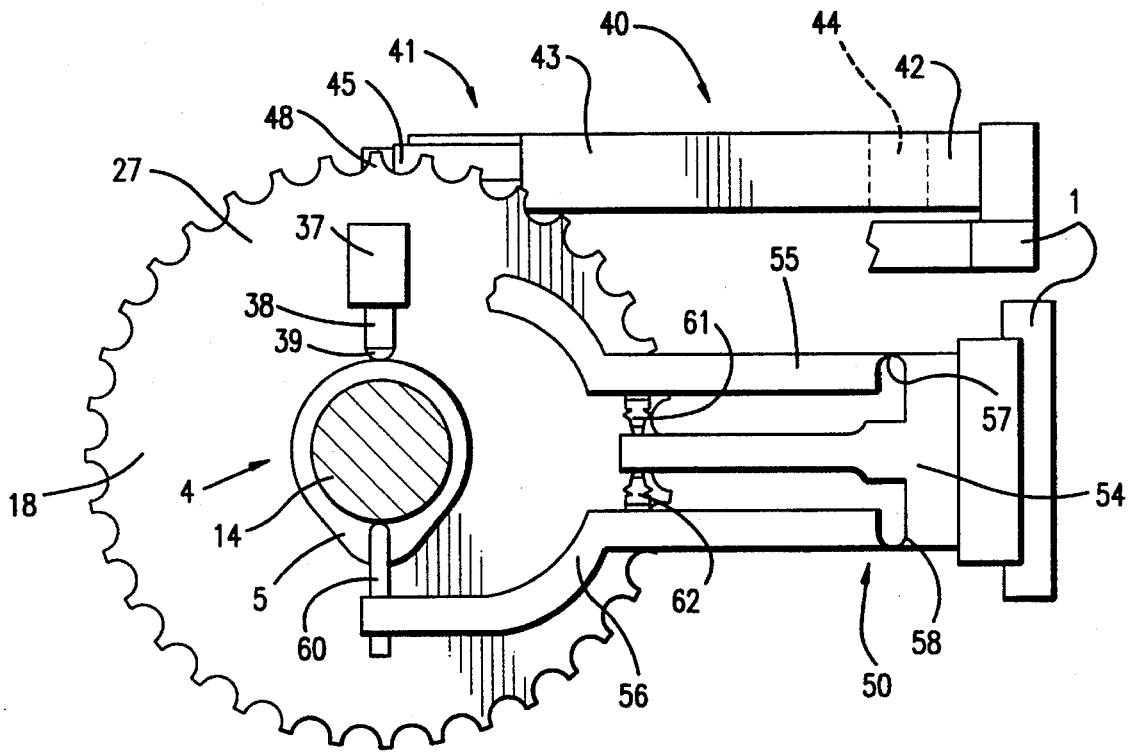
FIG. 3 is an enlarged scale cross-section of a detail of FIG. 1, along path III—III in FIG. 1, with some elements omitted for the sake of simplicity.

The apparatus, schematically shown in FIGS. 1, 2 and 3, comprises a support structure 1 with elements for the support and the mechanical reference including centers (only one, 3, is shown in FIG. 1) aligned along a longitudinal geometric axis. A camshaft 4 to be checked is arranged between centers 3 and comprises a plurality of eccentrical sections consisting of cams. In the illustrated example shaft 4 is a 4-cylinder engine camshaft that comprises eight cams 5, 6, . . ., 12, cylindrical parts or main journals 13, 14, 15, 16 and 17, located at other sections and, next to one end of the camshaft, a toothed wheel 18. Furthermore, to support structure 1 that, alike other elements of the apparatus, is here illustrated in an extremely schematic way for the sake of simplicity, there are coupled drive means with a motor 19 and transmission means 20 for the rotation of shaft 4 about the longitudinal geometric axis. A coupling device 21 is coupled to the transmission means 20 next to one of the centers. It comprises an integral fulcrum 22 that defines an axis of rotation and a thrust and driving portion 23 that can accomplish limited rotational displacements about the axis of rotation of fulcrum 22. The thrust and driving portion 23 comprises a driving jut 24 for the insertion in an associated hole 25, located on toothed wheel 18, for effecting a substantially clearance-free coupling.

Scanning means comprise an angular measuring system with a rotary transducer 26, including a diffraction grating interferometer, coupled to the transmission means 20, for measuring the angular elongations that shaft 4 undertakes, as a result of rotational displacements commanded by motor 19. Rotary transducer 26 comprises reference devices (not shown in FIG. 1) for determining an angular zero position. By virtue of the action of device 21 and of the longitudinal resilient pressure generated by means of integral fulcrum 22 between the end of shaft 4 and the transmission means 20, there is achieved a substantially clearance-free transmission coupling between shaft 4 and rotary transducer 26.

The checking means, also coupled to support structure 1, comprise first checking elements 27, 28, . . . 34 each including a linear transducer 35 for producing signals responsive to linear displacements of a movable stylus 36, and a transmission element, or follower, 37 with an associated stem 38 positioned along a radial direction with respect to the longitudinal axis. A feeler 39 is coupled at a free end of the stem 38 for contacting the working surface of a respective cam 5–12 and causing translation displacements of the stem 38 along said radial direction. The latter displacements are transmitted to the stylus 36 of transducer 35. The followers 37 transmit mere axial translation displacements to the styluses 36 of transducers 35 and absorb possible transversal stresses due to frictions between feelers 39 and the working surfaces of cams 5–12 while the latter are in rotation. Possible malfunctioning and damage is thus avoided to transducers 35, that can be particularly delicate instruments.

The checking means further comprise second checking elements, distinct from the first, as shown in FIG. 2, including a junction element 40 and a measuring head 41 for checking linear dimensions. The junction element 40 comprises a fixed part 42, rigidly coupled to support structure 1, a movable part 43 and an intermediate part 44 with an integral fulcrum that defines an axis of rotation for part 43. Head 41 comprises a casing 45, fixed to part 43, a feeler 46 for performing limited displacements with respect to casing 45 and position transducer means (not shown in the figures and including, for example, strain gauges) for providing signals responsive to the position of feeler 46. A limit stop projecting part 47 is obtained in part 43 for touching the surface of the toothed wheel 18 and defining a reference position for head 41 with respect to the wheel 18 itself. The location of the second checking elements is such that, when shaft 4 is loaded between centers 3, feeler 46 is—depending on the angular position of shaft 4—either in contact with a tooth of toothed wheel 18 or free in the space between two adjacent teeth.

The checking means still further comprise third checking elements with measuring heads 49–53 for checking linear dimensions. Each head (FIG. 3) has a fixed portion 54, coupled to support structure 1, two movable arms 55, 56 and two connection portions 57, 58, between movable arms 55, 56 and the fixed portion 54, with integral fulcra for defining rotation axes for movable arms 55, 56. Feeler elements 59, 60 are coupled at the free ends of arms 55, 56, respectively, and touch diametrally opposite points of the working surfaces of main journals 13–17, at points corresponding to the other sections of the camshaft. Two transducers 61, 62 provide signals indicative of the angular elongations of arms 55, 56 with respect to fixed portion 54.

A memorizing, processing and display unit, or control unit, 63 is connected to the first, second and third checking elements, to scanning means 26 and to drive means 19.

Figure 4:
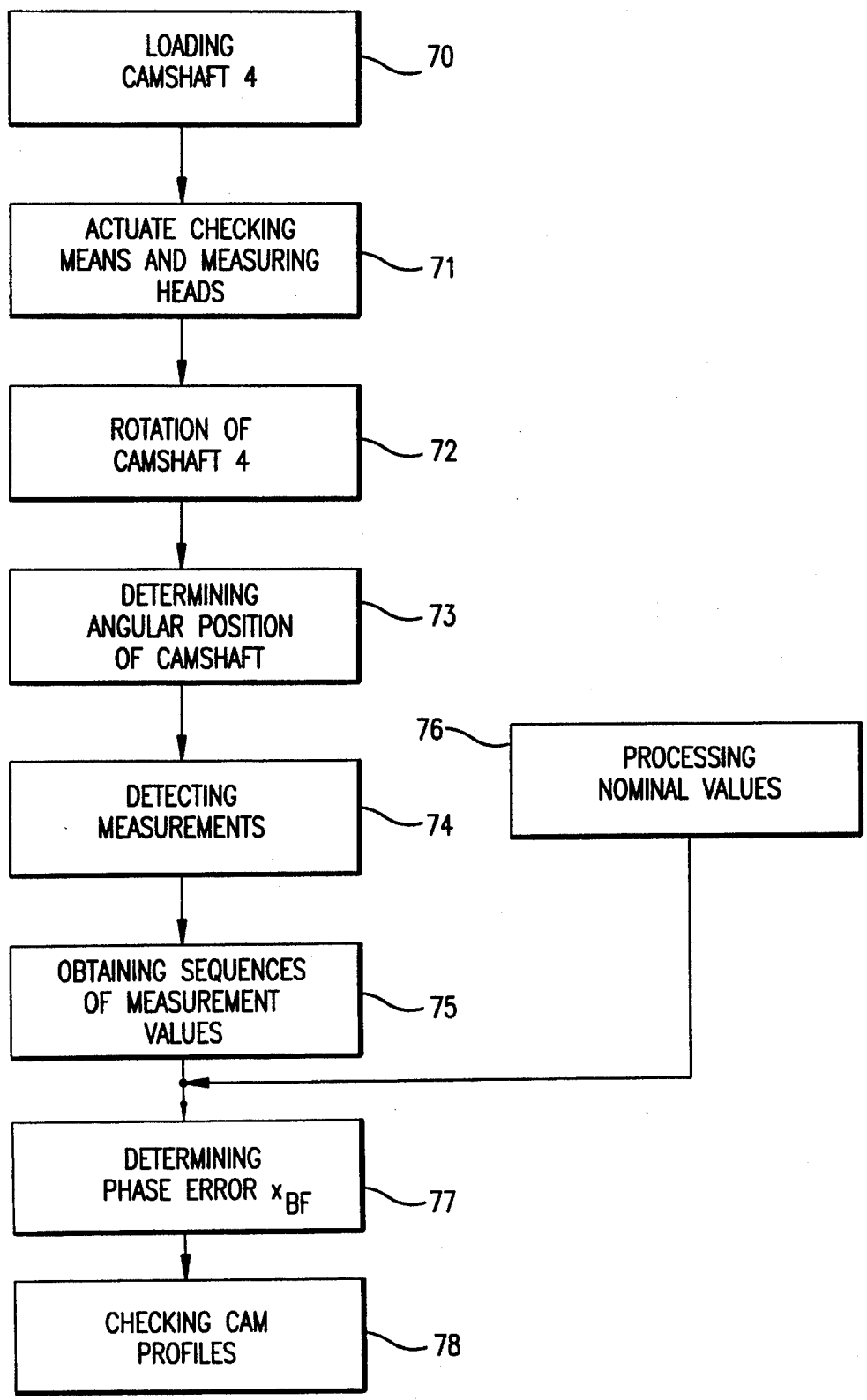
FIG. 4 is a block diagram relating to a checking method according to the invention.

Diagram of FIG. 4 illustrates synthetically the main steps of operation of the apparatus and the method according to the invention. The meaning of the various blocks is as follows:

Block 70: shaft 4 is loaded on the apparatus in a longitudinal position i.e. it is positioned between the centers;

center 3 is displaceable along the longitudinal axis to enable the loading and thereafter the clamping of shaft 4. In this position—thanks to the action of integral fulcrum 22 of device 21 and part 44 of element 40, the latter with integral fulcrum too—jut 24 of coupling device 21 and projecting part 47 of element 40 abut against toothed wheel 18.

Block 71: the first checking elements 27–34 and the measuring heads 49–53 are brought to the checking position by the displacing of associated parts of support structure 1. Said parts, not shown in the figures, comprise a substantially rigid support structure whereto there are clamped both the first checking elements 27–34 and the measuring heads 49–53.

Block 72: motor 19 is started and transmission means 20 together with coupling device 21 are rotated until jut 24 matches in hole 25 for the driving of wheel 18. The rotation commanded by motor 19 and the consequent rotation of shaft 4 continue until the angular zero position is detected by rotary transducer 26. In this position, by virtue of the particular construction characteristics of the apparatus, feeler 46 of head 41 contacts a tooth 48 of toothed wheel 18.

Block 73: in the course of further rotation displacements of shaft 4, that is driven by motor 19, the signals arriving from rotary transducer 26 and head 41, whose feeler 46 touches an angular reference portion of shaft 4, i.e. tooth 48 of wheel 18, are processed by unit 63 in order to locate, by means of rotary transducer 26, an exact angular position of wheel 18 and so determine an angular reference position for shaft 4.

Block 74: motor 19 is started again and shaft 4 is made to rotate. In the course of the rotation there simultaneously occur the detection and the memorizing of the values relating to the signals provided by all transducers 35 and heads 49–53 at a prefixed number of points which correspond to detection angular positions, determined by rotary transducer 26 at one-degree angular spacings starting from the previously determined angular reference position. This step ends at the completion of a 360° rotation starting from the first detection angular position.

Block 75: the detected values, memorized for each detection position, are processed in unit 63 in order to provide for each of cams 5–12 a sequence of 360 measurement values h(i) of corresponding radial dimensions.

Block 76: values t(i) (i=1, 2, . . ., 360) corresponding to the nominal profiles of cams 5–12, memorized in unit 63, are processed in order to determine values t ($\alpha$) representing the radial dimensions along the entire nominal profile of each cam, i.e. substantially for any angular position of shaft 4.

Block 77: the measurement values h(i) of each cam 5–12 and the corresponding nominal values t($\alpha$) are processed in unit 63 in order to determine the value $x_{BF}$ of an angle corresponding to the angular arrangement error of the cam on shaft 4 with respect to the nominal profile.

Block 78: the measurement values h(i) of each cam 5–12 and the corresponding values t($\alpha$) of the nominal profile angularly displaced of the quantity $x_{BF}$, are processed in unit 63 in order to determine the characteristics of the cam profile.

As far as the step of block 73 is concerned, the angular reference position of shaft 4 is determined with considerable accuracy thanks to the high resolution of rotary transducer 26 (for example 0,050°, or 0,025°) and the processing of signals of head 41. More specifically, according to the illustrated embodiment, head 41 scans the surface of wheel 18 in correspondence with tooth 48, along a short circumference arc that is centered with respect to the zero position of rotary transducer 26. In the course of the scanning, for each resolution unit of transducer 26, head 41 sends a signal value to control unit 63. As the specific shape of feeler 46 is known, it is possible to accurately establish along the scanning arc the points of the surface of wheel 18 that correspond to the edges of tooth 48 and the subsequent processings in unit 63 enable one to determine, with a degree of accuracy equal to the above mentioned resolution, the angular position of a radius of wheel 18 passing through the center of tooth 48. This angular reference position forms the first detection angular position and serves to determine, by starting from it, the one-degree spacings that separate the following detections.

The operations referred to in block 75 comprise, for example, for each cam 5–12 and for each detection angular position, the processing of the detected value representing the signal provided by the corresponding transducer 35 with the values of the signals provided by two of the heads 49–53, generally the two heads that are located adjacent to the corresponding follower 37 along the longitudinal axis, for referring the radial dimensions of cams 5–12 to longitudinal axes that are automatically determined by the third checking elements. With reference to FIG. 1, and in particular to cam 5, the values memorized in the previous step (block 74), are those provided by transducer 35 of the checking element 27 and by heads 49, 50. The processing in unit 63 of the signals provided by each of heads 49–53 enables to determine eccentricity and inclination errors in the arrangement of the sections corresponding to the main journals 13–17 with respect to the longitudinal geometric axis defined by centers 3. Depending on these errors, it is possible to perform (in unit 63) corresponding compensations of the detected values provided by transducers 35 that regard the radial dimensions of cams 5–12, by referring, for example, the measurements to the axis defined by the centers of the main journals adjacent to the cam being inspected or at a known distance from it. The aforementioned positioning errors can be due, among other things, to clearances between shaft 4 and centers 3, or to flexions of shaft 4.

The processings referred to in block 76 are completed in unit 63 at a time that need not necessarily be determined but that in any case precedes the operations referred to in block 77. These processings comprise mathematical interpolations of the known values t(i) (i=1, 2, . . ., 360) relating to the profile of each cam 5–12, for example a Taylor series expansion that, limited to the terms up to the second order, enables to express the value t (i+x) (x generally <1°), starting from a known value t (i), as $$t(i+x) = t(i) + (dt/d\alpha)_i x + (d^2t/d\alpha^2)_i (x^2/2) \tag{1}$$

The $(dt/d\alpha)_i$ and $(d^2t/d\alpha^2)_i$ values are indicative of the slope and slope variation of the nominal profile of the cam at a point corresponding to the whole angle i, and are generally known beforehand, respectively as the speed v(i) and the acceleration a(i) of the cam (in particular they are provided under the form of tables together with the values t(i) for determining the shape of the nominal profile of the cam). The processing according to (1) is thus particularly simple.

The operations referred to in block 77 comprise, for each cam 5–12, the processing of the measurement values h(i) (i=1, 2, . . ., 360) together with corresponding nominal values obtained through (1), in order to obtain the $x_{BF}$ value of an angle of mutual angular dispacement, or phase difference, between the nominal and the checked profile, representing an error in the phase, or timing angle, of that cam 5–12. This processing consists, for example, in applying the least squares method for minimizing the deviations between the measurement values h(i) and the nominal values t(i+x). By defining the generic deviation S(i) as $$S(i)=h(i)-t(i+x) \quad (2)$$

and $$SS=\Sigma_i S(i)^2 \quad (i=1,2,\ldots,360) \quad (3)$$

according to the least squares method, the angle that best approximates the nominal profile to the checked profile, will have the value $x_{BF}$ so that $$d\ SS/dx=0 \quad (4)$$

Without illustrating in detail the single mathematical steps that lead to the final result, it appears obvious that with a suitable program for solving equation (4), unit 63 can provide the desired $x_{BF}$ value of the angular arrangement error between nominal and checked profile.

For the sake of simplicity and clarity, in the previous description (regarding, for example, the profile of the cam identified by reference number 5 in FIGS. 1 and 3) it has been considered null the known angle β of nominal angular position, or phase difference, of the checked cam with respect to the angular reference position, representing the nominal angular position of each cam 5–12 on shaft 4. It is obvious that as β is a known value for each cam, its introduction in the previous formulae does not substantially modify the processing.

Figure 5:
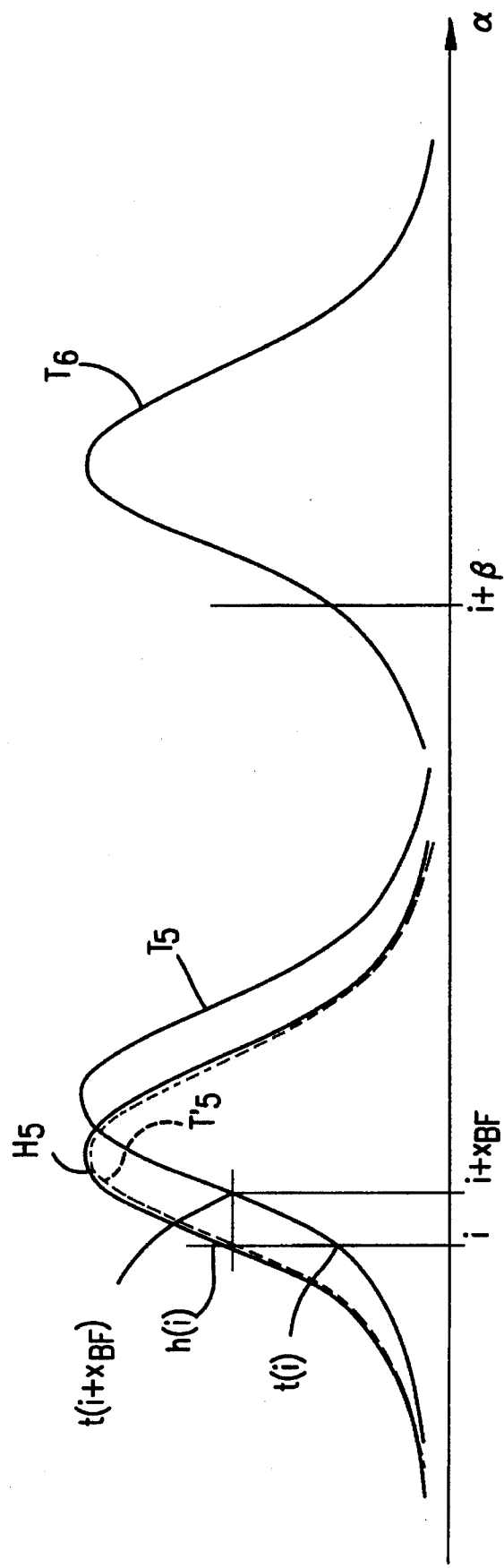
FIG. 5 is a graph for illustrating a step of the method referred to FIG. 4.

The graph of FIG. 5 shows the real profile $H_5$ of cam 5 (where β=0) according to the measurement values h(i), the nominal profile $T_5$ according to values t(i) and the nominal profile that best approximates the real profile $H_5$, or "best-fit" nominal profile, $T'_5$, and that is obtained by angularly shifting $T_5$ of angle $x_{BF}$, as shown in the graph with a dashed line. FIG. 5 also illustrates the nominal profile of cam 6, $T_6$, displaced of a known angle β with respect to the angular reference of shaft 4.

The operations referred to in block 77 consist, in practice, in determining the profile T' that has the same shape as the nominal profile T and best approximates the real profile H.

The processings referred to in block 78 substantially comprise, for each of cams 5–12, comparisons between the real profile H and the nominal best-fit profile, in particular the values of the deviations between the measurement values h(i) and the values $t(i+x_{BF})$ are calculated, and on the base of such deviations, dimensional features (such as the radiuses of the base circles of the cams 5–12), and/or shape features (such as the slope and slope variations of the opening and closing ramps or of other parts of the cams 5–12) are checked. In this way the angular arrangement error between nominal and real profile, apart from being correctly evaluated ($x_{BF}$), will have no influence on the checking of profile features, and thus the checking is particularly reliable and accurate.

The previously mentioned method for providing a substantial continuous generation of values of the nominal T profile, in other terms the application of the Taylor series expansion, represents just one possible example of the interpolation of the known values t(i) and is not obviously restrictive for the embodiment of this invention. Furthermore, it is also possible to provide values of the radial dimensions along the entire real profile H (instead of values t(α) of the nominal profile T) by interpolation of the measurement values h(i) (instead of the nominal values t(i)): and even though under this circumstance the operations are generally less simple and practical owing to the need, for example, of calculating the speed and acceleration values, it is nevertheless possible to perform the steps substantially as explained with reference to block 77 so as to provide the value $x_{BF}$ of the angular arrangement error.

The apparatus herein described enables the checking of profiles of all cams 5–12 of shaft 4, by means of the substantially simultaneous detection and memorizing (block 74) of all the signals produced by transducers 35 and heads 49–53 for each of the detection angular positions scanned by rotary transducer 26. The values are so "frozen", stored in unit 63 where they are subsequently read in sequence in order to be processed. This type of measurement taking enables the obtaining of radial values all corresponding to a same precise angular reference thus avoiding errors that would arise in the event that the measurement detections were made by a however rapid scanning of the signals of transducers 35 and heads 49–53. In fact, in this case, angular displacements of shaft 4 in the course of the scanning would cause not negligible angular differences among the detections of the signals of different transducers 35 and heads 49–53.

The detection of the angular position of shaft 4, by means of head 41, provides an accurate reference, common to all cams 5–12, thus allowing to check both the angular position of the single cams on the shaft and the angular mutual arrangements among the various cams.

The feelers 39 may have shapes different from the generically spherical ones that are schematically shown in the figures. In particular, it might be noted that, owing to the rotational asymmetry of the cams 5–12, each of the feelers 39 as shown in FIG. 3 touches the working surface of the relevant rotating cam (5) at a plurality of points on a curvilinear contact line (substantially the line drawn in FIG. 3). In order to eliminate possible errors in the checking operations caused by interferences between the curvature of feelers 39 and the curvature of the working surfaces of the cams 5–12 to be checked, so called knife feelers may employed. The main feature of a knife feeler is a cylindrical or prismatic surface defining a rectilinear contact line (a generating line of the cylindrical surface, or an edge of the prismatic one) for contacting the part to be checked. Each of such feelers may in particular be coupled to one of the stems 38, so that its rectilinear contact line touches the working surface of the relevant cam (5–12), the line being arranged perpendicular to the radial direction defined by the stem 38, substantially on a plane parallel to the plane of FIG. 3. In the course of rotation of the camshaft 4, the feelers translate along radial directions together with the stems 38 of the followers 37. In such a way, the movements of each feeler result strictly bound to radial variations of the dimensions of the cam, since the rectilinear contact line keeps arranged on directions that are parallel to one another and tangential to the working surface of the cam. A plurality of points of each line touch the surface of the relevant cam (5) in the course of the rotation.

Whether knife feelers are employed or not, it is furthermore possible to compensate errors caused by unpredictable wear of the contact lines (or areas), and/or by the curvature of the same, by periodically loading in longitudinal, measurement position a setup master of a well known shape and stable dimensions, and carrying out a setting cycle on said setup master. The setup master is a particular camshaft in which cylindrical surfaces of hard material (for example special steel for masters) having an axis parallel to the longitudinal axis of the shaft and eccentric with respect to it, are in the place of the outer surfaces of the cams. During the setting cycle, the feelers touch the cylindrical surfaces, and linear transducers 35 provide signals to the control unit 63: every differences in the processed signals with respect to known sinusoidal paths corresponding to the precise shapes of the cylindrical surfaces are caused by the curvature of the feelers and/or wear or other defects in the contact lines. It is possible, during such setting cycle, to memorize error signals on the base of the above mentioned differences. With a proper algorithm that makes an angular comparison between points of the cylindrical surfaces of the setup master and points of the nominal profiles T of the cams 5–12, it is also possible to process the error signals to get proper wear compensation signals, the latter being stored and then processed to correct the measurement values h(i).

Other embodiments of the second measuring elements can be foreseen in order to meet different manufacturing characteristics of the shaft to be checked, that can be made without the toothed wheel 18. Possible embodiments can foresee suitable measuring heads, in the place of head 41, for touching, for example, a seat for a key, located on the lateral surface of the camshaft to be checked, in order to accurately determine a mid-section of said seat and so define the angular reference position (FIG. 4, block 73).

In addition to the previously outlined cam profile checkings, an apparatus like the one herein described can foresee the carrying out of further checkings relating to other characteristics of shaft 4 (for example in relation to the shape and/or the dimensions of the main journals 13–17), by means of the described checking means and/or further means that can be provided for and coupled to control unit 63.

Lastly, it is obvious that, as the manufacturing characteristics of the shaft to be checked vary insofar as, for example, the number and/or the arrangement of the cams are concerned, the structure of the apparatus will be consequently adapted, by varying, for example, the number and/or the arrangement of the first and third checking elements.

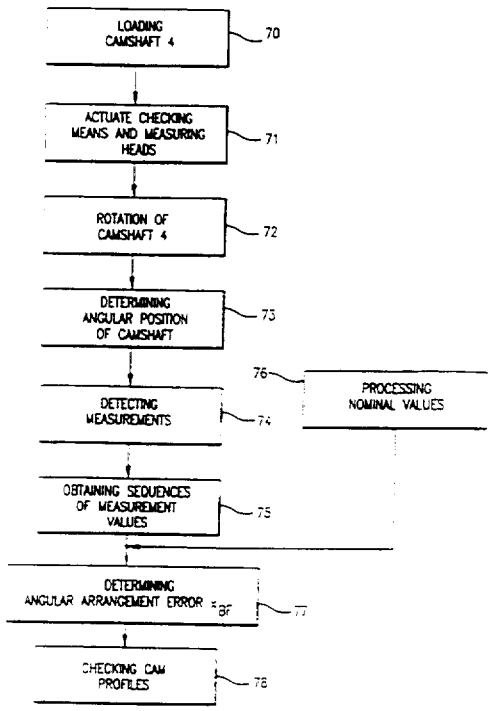

I claim:

1. An apparatus for checking geometric and dimensional characteristics of a camshaft (4) having cams (5–12) thereon, comprising:

a support structure (1) with elements for the support and the mechanical reference (3, 20, 21) of the camshaft (4) that define a longitudinal geometric axis, drive means (19) for rotating the camshaft, checking means (27–47, 49–62), coupled to the support structure (1), comprising first checking elements (27–39) which are respectively adapted to cooperate with the outer surface of the cams (5–12) and provide a plurality of signals respectively responsive to the radial dimensions of the cams (5, 12) during the course of the rotation of said camshaft, scanning means (26); and a memorizing, processing and display unit (63), connected to the checking means (27–47, 49–62) and to the scanning means (26), for processing said signals responsive to the radial dimensions of the cams (5–12), said checking means (27–47, 49–62) further comprising second checking elements (40–47), distinct from the first checking elements (27–39), cooperating with an angular reference portion (48) of the camshaft (4), said memorizing, processing and display unit (63) being adapted to define (73), on the basis of the signals provided by the second checking elements (40–47), a determined angular reference position for the camshaft (4), memorize (74), in correspondence to said determined angular reference position of the camshaft (4) and to each of prefixed angular spacings starting from said reference position, values detected from the signals provided by all the first checking elements (27–39), said prefixed angular spacings being scanned, in the course of the camshaft rotation, by the scanning means (26), process (75) said detected values to provide sequences of relevant measurement values (h(i)) of radial dimensions of the cams (5–12), compare the measurement values (h(i)) for each cam (5–12) with corresponding values (t(α)) relating to a known nominal profile (T) and process (77) the results of these comparisons for obtaining a value of an angular arrangement error ($X_{BF}$) between the sequence of measurement values (h(i)) and the nominal profile (T), and process (78), for each of the cams (5–12), the measurement values (h(i)), the values (t(α)) relating to the nominal profile (T) and the angular arrangement error ($X_{BF}$) for checking parameters regarding the profiles of the cams (5–12).

2. An apparatus according to claim 1, wherein the memorizing, processing and display unit (63) is adapted to display, for each of the cams (5–12), the measurement values (h(i)), the values (t(α)) relating to the nominal profile (T) and the angular arrangement error ($X_{BF}$).

3. An apparatus according to claim 1, wherein said camshaft further includes substantially cylindrical portions and wherein said checking means further comprises third checking elements (49–62) with measuring heads (49–53) coupled to the support structure (1) and adapted to cooperate with the outer surface of said substantially cylindrical portions (13–17) of the camshaft (4), the measuring heads (49–53) comprise transducer means (61, 62) connected to the memorizing, processing and display unit (63) to provide signals responsive to the position of said substantially cylindrical portions (13–17) with respect to the longitudinal geometric axis, the memorizing, processing and display unit (63) being adapted to process said signals with the signals of the first checking elements (27–39) for obtaining said sequences of measurement values (h(i)).

4. An apparatus according to claim 1, wherein the scanning means comprise a rotary transducer (26).

5. An apparatus according to claim 4, wherein the rotary transducer (26) has a 0.025° resolution.

6. An apparatus according to claim 1, wherein the second checking elements (40–47) comprise a measuring head (41) with a feeler (46) adapted to touch said angular reference portion (48) of the camshaft (4) and transducer means, and a junction element (40) having a fixed part (42) coupled to the support structure (1), a movable part (43) for carrying the measuring head (41), and an intermediate part (44), located between the fixed part (42) and the movable part (43), for defining an axis of rotation, the movable part (43) providing a limit stop projecting part (47) adapted to cooperate with a surface of the camshaft in correspondence to the angular reference portion (48) for defining a reference position for said head (41).

7. An apparatus according to claim 6, wherein said transducer means of the measuring head (41) comprise strain gauges.

8. An apparatus according to claim 1, wherein the elements for the support and the mechanical reference (3, 20, 21) comprise transmission means (20), coupled to the drive means (19), for transmitting to the camshaft (4) a rotational movement about the longitudinal axis and a coupling device (21–24) adapted to generate a resilient pressure action between the transmission means (20) and the camshaft (4) along a direction substantially parallel to said longitudinal axis, the scanning means (26) being coupled to the transmission means (20).

9. An apparatus according to claim 8, wherein the coupling device (21) comprises a thrust and driving portion (23) adapted to cooperate with the camshaft (4) and an integral fulcrum (22), located between the thrust portion (23) and the transmission means (20), for generating said resilient action and providing a substantially clearance-free transmission coupling between the camshaft (4) and the scanning means (26).

10. An apparatus according to claim 8, wherein the first checking means (27–39) comprise transducers (35) and transmission elements (37) coupled to the transducers (35) and including axially movable stems (38) and feeler element (39) coupled to the stems (38), the feeler elements (39) being adapted to contact the surface of the cams (5–12), the stems (38) being adapted to transmit to the transducers (35) axial displacements responsive to the variations of the radial dimensions of the cams (5–12) in the course of the camshaft (4) rotation.

11. A method for checking dimensional features of a camshaft (4) having cams (5–12), thereon by means of an apparatus with first and second checking elements (27–39, 40–47), comprising the steps of:

generating (72) mutual rotational displacements between the camshaft (4) and the first and second checking elements (27–39, 40–47), determining (73), in the course of the rotational displacements, an angular reference position for the camshaft (4) by means of said second checking elements (40–47), detecting (74,75), in the course of the rotation of the camshaft, by means of the first checking elements (27–39), measurement values (h(i)) relating to the radial dimensions of the camshaft (4) that define actual profiles (H) of said cams (5–12), the measurement values (h(i)) being detected for said cams as a group during the course of said rotation in correspondence to said angular reference position and at prefixed angular spacings starting from said angular reference position, processing (77) the measurement values (h(i)) with the values (t(α)) of the nominal profiles (T) in order to determine, the value of an angular arrangement error ($X_{BF}$) between the actual profile (H) and the corresponding nominal profile (T) of each cam (5–12), and calculating (78), in view of the determined angular arrangement error ($X_{BF}$), values of deviations between the measurement values (h(i)) and the values (t(α)) of the corresponding nominal profiles (T).

12. The method according to claim 11, wherein the step of processing (77) the measurement values (h(i)) with the values (t(α)) of the nominal profiles (T) for determining the value of the angular arrangement error ($x_{BF}$) for each cam (5–12), comprises the application of the least squares method between the measurement values (h(i)) and the values (t(α)) of the corresponding nominal profile (T).

13. The method according to claim 11, comprising the further step of displaying said deviations between the measurement values (h(i)) and said values (t(α)) of the corresponding nominal profiles (T).

14. The method according to claim 11, comprising the step of electronically memorizing for each cam (5–12) known values (t(i)) of parameters of the associated nominal profile (T) for a prefixed number of points at different angular positions, the measurement values (h(i)) for each cam (5–12) being detected (74) for an equal number of points.

15. The method according to claim 14, wherein said prefixed angular spacings are of 1 degree.

16. The method according to claim 11, comprising the further step of processing (76), for each cam (5–12), a sequence of known values (t(i), V(i), a(i)) relating to the nominal radial dimensions of the cam at determined angular positions, in order to obtain said values (t(α)) of the nominal profiles (T) substantially for any angular position of the camshaft (4).

17. The method according to claim 16, comprising the step of electronically memorizing for each cam (5–12) known values (t(i)) of parameters of the associated nominal profile (T) for a prefixed number of points at different angular positions, the measurement values (h(i) for each cam (5–12) being detected (74) for an equal number of points.

18. The method according to claim 16, wherein the step of detecting (74, 75) the values (h(i)) comprises the substantially simultaneous detection and memorizing (74) of signals of the first checking elements (27–39) relative to all the cams (5–12), in correspondence to the angular reference position of the camshaft (4), and, in the course of the rotation, in correspondence to each of said prefixed angular spacings from it, and subsequently the processing (75) of said signals in order to obtain the measurement values (h(i)).

19. The method according to claim 18, wherein the step of detecting (74, 75) the values (h(i)), in correspondence to the angular reference position of the camshaft (4) and at prefixed angular spacing from it, comprises measuring said angular spacings and providing detection controls by means of angular scanning means (26).

20. The method according to claim 19, wherein said prefixed angular spacings are of 1 degree.

21. The method according to claim 18, wherein the camshaft (4) defines an angular reference portion (48) and the step of determining (73) an angular reference position of the camshaft (4) comprises scanning, by the second checking elements (40–47)), the angular reference portion (48) in the course of said mutual rotation displacements and processing the resultant electric signals with signals provided by angular scanning means (26).

22. The method according to claim 21, wherein the step of detecting (74, 75) the values (h(i)) comprises the detection and the memorizing (74) of signals provided by third checking elements (49–62) that cooperate with substantially cylindrical sections (13–17) of the camshaft (4) in order to attain information regarding the eccentricity of these sections (13–17) with respect to a longitudinal reference axis of the camshaft (4), and the subsequent processing (75) of the signals provided by the first (27–39) and by the third (49–62) checking elements in order to obtain the measurement values (h(i)).

23. The method according to claim 22, wherein said detection and memorizing of the signals of the third checking elements (49–62) occurs in correspondence to the angular reference position of the camshaft (4) and at prefixed angular spacings from it, in substance simultaneously to the detection and the memorizing of the signals of the first checking elements (27–39).

24. An apparatus for checking geometric and dimensional characteristics of a camshaft having cams thereon, comprising:

a support structure for the camshaft, drive means for rotating the camshaft, first checking elements which respectively provide signals responsive to the radial dimensions of the cams as a group during rotation of the camshaft, second checking elements which provide signals responsive to an angular reference portion of the camshaft, a scanner which provides signals responsive to angular spacings in the course of rotation of the camshaft, and a memorizing, processing and display unit connected to the first checking elements, second checking elements and scanner, for processing said signals, defining an angular reference position of the camshaft, and calculating geometric and dimensional characteristics of each cam.

25. A method for checking geometric and dimensional features of a camshaft having cams thereon, comprising the steps of:

rotating the camshaft, determining, in the course of said rotation, an angular reference position for the camshaft, detecting, in the course of said rotation, measurement values relating to the radial dimensions of the camshaft that define the profile of said cams, the measurement values being detected for said cams as a group during the course of said rotation in correspondence to said angular reference position and at angular spacings starting from it, and comparing the measurement values with corresponding nominal values for said cams to discern differences.

* * * * *

UNITED STATES PATENT AND TRADEMARK OFFICE
CERTIFICATE OF CORRECTION

PATENT NO. : 5,508,944
DATED : April 16, 1996
INVENTOR(S) : DANIELLI

It is certified that error appears in the above-indentified patent and that said Letters Patent is hereby corrected as shown below:

The title page, should be deleted to be replaced with the attached title page.

Figure 4 (Page 3 of 4 of the drawings), box 77 please delete [DETERMINING PHASE ERROR $X_{BF}$] and insert

--DETERMINING ANGULAR ARRANGEMENT ERROR $X_{BF}$-- .

Signed and Sealed this

Seventeenth Day of September, 1996

Attest:

BRUCE LEHMAN

*Attesting Officer*  *Commissioner of Patents and Trademarks*

United States Patent [19]

Danielli

[11] Patent Number: 5,508,944
[45] Date of Patent: Apr. 16, 1996

[54] APPARATUS AND METHOD FOR CHECKING FEATURES OF A CAMSHAFT

[75] Inventor: Franco Danielli, Zola Predosa (BO), Italy

[73] Assignee: Marposs, S.p.A., Bentivoglio-BO, Italy

[21] Appl. No.: 211,492

[22] PCT Filed: Nov. 2, 1992

[86] PCT No.: PCT/EP92/02512

§ 371 Date: Apr. 7, 1994

§ 102(e) Date: Apr. 7, 1994

[87] PCT Pub. No.: WO93/10420

PCT Pub. Date: May 27, 1993

[30] Foreign Application Priority Data

Nov. 12, 1991 [IT] Italy .................... BO91A0417

[51] Int. Cl.⁶ .................................................. G01B 5/20
[52] U.S. Cl. .............................. 364/560; 33/519; 33/546; 33/551; 33/558.2; 364/506
[58] Field of Search .................... 33/519, 546, 551, 33/556, 558.01, 558.2; 364/463, 506, 560

[56] References Cited

U.S. PATENT DOCUMENTS

| | | | |
|---|---|---|---|
| 3,234,655 | 2/1966 | Skeels et al. | 33/519 X |
| 3,269,257 | 8/1966 | Hoglund | 33/519 X |
| 3,532,863 | 10/1970 | Enslein et al. | 33/519 X |
| 3,731,386 | 5/1973 | Kreiensen et al. | 33/519 X |
| 3,805,036 | 4/1974 | Michaud et al. | 364/560 |
| 4,622,756 | 11/1986 | Marsden | 33/556 |
| 5,140,534 | 8/1992 | Miller et al. | 364/560 |

FOREIGN PATENT DOCUMENTS

| | | |
|---|---|---|
| 2552873 | 10/1984 | France. |
| 1938231 | 7/1969 | Germany. |
| 8629052.5 | 10/1986 | Germany. |
| 1273479 | 7/1970 | United Kingdom. |
| 2148007 | 10/1983 | United Kingdom. |
| 1388138 | 10/1986 | United Kingdom. |

Primary Examiner—Edward R. Cosimano
Attorney, Agent, or Firm—Dickstein, Shapiro & Morin

[57] ABSTRACT

A camshaft checking apparatus, in particular for checking the parameters of the profiles of cams, comprising a support structure and a motor means for positioning and axially rotating the shaft, linear transducers for determining radial dimensions of cams in the course of the rotation, a measuring head for cooperating with a reference portion of the camshaft and locating an angular shaft reference position, a rotary transducer for defining said angular position and angular measuring positions, and a control unit for receiving and processing signals arriving from the linear transducers, measuring head and the rotary transducer. For each cam a sequence of values pertaining to its profile is memorized and processed, the value of the mutual phase difference with respect to a nominal profile is calculated, and the actual profile to be checked is inspected with reference to a second nominal profile determined by angularly displacing the nominal profile by an angle equal to the value of the calculated phase difference.

25 Claims, 4 Drawing Sheets